US012180774B1

(12) United States Patent
Fisher et al.

(10) Patent No.: US 12,180,774 B1
(45) Date of Patent: Dec. 31, 2024

(54) SELF-CLOSE AND SLOW-CLOSE HINGE

(71) Applicant: Cosmetal Fab LLC, Honey Brook, PA (US)

(72) Inventors: Ivan Fisher, Honey Brook, PA (US); Jeff Davis, Womelsdorf, PA (US); Mason Rhine, Womelsdorf, PA (US)

(73) Assignee: Cosmetal Fab LLC, Honey Brook, PA (US)

( * ) Notice: Subject to any disclaimer, the term of this patent is extended or adjusted under 35 U.S.C. 154(b) by 0 days.

(21) Appl. No.: 18/357,584

(22) Filed: Jul. 24, 2023

(51) Int. Cl.
*E05F 3/20* (2006.01)
*E05F 1/12* (2006.01)

(52) U.S. Cl.
CPC .............. *E05F 3/20* (2013.01); *E05F 1/1215* (2013.01); *E05Y 2201/21* (2013.01); *E05Y 2201/484* (2013.01); *E05Y 2900/132* (2013.01)

(58) Field of Classification Search
CPC ......... E05F 1/1207; E05F 1/1215; E05F 3/20; E05F 3/16
USPC .............................................................. 16/50
See application file for complete search history.

(56) References Cited

U.S. PATENT DOCUMENTS 291,169 A * 1/1884 Duncan ................. E05F 1/1215 16/300
877,440 A * 1/1908 Levin ........................ E05F 3/20 16/49
1,612,237 A * 12/1926 Thornton .................. E05F 3/20 16/49
2,520,616 A * 8/1950 Wasson ................. E05F 1/1215 16/300
3,613,152 A 10/1971 Spurlin
3,965,533 A * 6/1976 Frohlich ............... E05F 1/1215 16/72
3,978,551 A * 9/1976 Mochizuki ............ E05F 1/1215 16/72
3,999,246 A * 12/1976 Suska ....................... E05D 5/14 16/273
4,073,037 A * 2/1978 Curry .................... E05D 7/1016 16/50
4,073,038 A * 2/1978 Curry .................... E05F 1/1215 16/50

(Continued)

FOREIGN PATENT DOCUMENTS

CN 107461101 A 12/2017
CN 108756554 A 11/2018

(Continued)

*Primary Examiner* — Jeffrey O'Brien
(74) *Attorney, Agent, or Firm* — Barley Snyder

(57) ABSTRACT

A hinge includes a hinge body, a self-close mechanism disposed within the hinge body, and a slow-close mechanism disposed within the hinge body. The hinge body has a first portion and a second portion, the first portion is rotatable with respect to the second portion between an open position and a closed position. The self-close mechanism applies a closing force on the first portion from a first angle of rotation between the first portion and the second portion to the closed position, the closing force urging the first portion to the closed position. The slow-close mechanism applies a damping force on the first portion from a second angle of rotation between the first portion and the second portion to the closed position, the damping force slowing a rotational speed of the first portion to the closed position.

20 Claims, 12 Drawing Sheets

(56) References Cited

U.S. PATENT DOCUMENTS

| | | | | | |
|---|---|---|---|---|---|
| 4,102,013 | A * | 7/1978 | Newlon | E05D 5/128 | 16/222 |
| 4,339,845 | A * | 7/1982 | Newlon | E05F 1/1215 | 16/300 |
| 4,351,085 | A * | 9/1982 | Suska | E05D 7/02 | 16/273 |
| 4,419,788 | A * | 12/1983 | Prout | E05F 1/1215 | 16/300 |
| 4,485,522 | A * | 12/1984 | Chen | E05F 3/20 | 16/303 |
| 4,583,262 | A * | 4/1986 | Werner | E05F 1/1215 | 16/300 |
| 5,048,155 | A * | 9/1991 | Hwang | E05F 1/1215 | 16/301 |
| 5,572,768 | A * | 11/1996 | Daul | E05F 3/20 | 16/337 |
| 5,584,100 | A * | 12/1996 | Doyle | E05F 1/1215 | 16/300 |
| 5,606,774 | A * | 3/1997 | Wu | E05D 3/12 | 16/366 |
| 5,715,574 | A * | 2/1998 | Schall | E05F 1/1215 | 16/50 |
| 6,256,839 | B1 * | 7/2001 | Wu | E05F 1/1215 | 16/302 |
| 6,460,220 | B1 * | 10/2002 | Jackson | E05F 1/1215 | 16/374 |
| 6,618,902 | B2 * | 9/2003 | Wu | E05F 1/1215 | 16/273 |
| 6,732,408 | B2 * | 5/2004 | Wu | E05D 11/00 | 16/273 |
| 7,210,199 | B2 * | 5/2007 | Clark | E05D 5/06 | 16/319 |
| 8,549,707 | B2 * | 10/2013 | Macernis | E05F 1/1215 | 16/50 |
| 8,898,860 | B2 * | 12/2014 | Bacchetti | E05F 3/20 | 16/303 |
| 8,955,194 | B2 * | 2/2015 | Teta | E05F 1/006 | 16/222 |
| 9,169,681 | B2 | 10/2015 | Cooper et al. | | |
| 9,759,000 | B2 * | 9/2017 | Stuart | E05D 5/06 | |
| 10,626,651 | B2 * | 4/2020 | Chang | E05F 3/20 | |
| 10,633,905 | B2 * | 4/2020 | Feng | E05F 1/1223 | |
| 10,641,025 | B2 * | 5/2020 | Stuart | E05F 3/20 | |
| 10,858,873 | B2 * | 12/2020 | Talpe | E05D 3/02 | |
| 11,078,702 | B2 * | 8/2021 | Babikian | E05D 5/10 | |
| 11,091,946 | B2 * | 8/2021 | Wu | E05D 11/06 | |
| 11,739,580 | B2 * | 8/2023 | Rapp | E05D 3/02 | 16/54 |
| 12,054,975 | B2 * | 8/2024 | Sampson | E05D 5/128 | |
| 2005/0044661 | A1 * | 3/2005 | Cho | E05F 1/1223 | 16/76 |
| 2007/0136991 | A1 * | 6/2007 | Huang | E05D 11/084 | 16/307 |
| 2009/0025181 | A1 * | 1/2009 | Burger | E05F 3/20 | 16/286 |
| 2011/0072618 | A1 * | 3/2011 | Chen | E05F 1/1215 | 16/303 |
| 2014/0075720 | A1 * | 3/2014 | Caffin | E05F 1/1215 | 16/298 |
| 2017/0362870 | A1 * | 12/2017 | Vera | E05F 1/1215 | |
| 2021/0180381 | A1 * | 6/2021 | Wu | E05F 3/20 | |
| 2021/0363805 | A1 * | 11/2021 | Mitchell | E05D 11/1028 | |
| 2022/0186539 | A1 * | 6/2022 | Xue | E05F 3/20 | |
| 2023/0146774 | A1 * | 5/2023 | Talpe | E05F 3/12 | 16/54 |

FOREIGN PATENT DOCUMENTS

| | | |
|---|---|---|
| CN | 208918438 U | 5/2019 |
| KR | 102430387 B1 | 8/2022 |

* cited by examiner

SELF-CLOSE AND SLOW-CLOSE HINGE

FIELD OF THE INVENTION

The present invention relates to a hinge and, more particularly, to a hinge that is self-closing and slow-closing.

BACKGROUND

Some hinges have self-closing features that take effect within a certain angle of rotation of the hinge. The self-closing, however, often does not apply beyond this certain angle, allowing a user to inadvertently leave a door attached to the hinge open when the user is uncertain if the door is positioned within the self-closing range. Further, the force provided for self-closing accelerates the door into the closed position, creating disruptive noise each time the door self-closes.

SUMMARY

A hinge includes a hinge body, a self-close mechanism disposed within the hinge body, and a slow-close mechanism disposed within the hinge body. The hinge body has a first portion and a second portion, the first portion is rotatable with respect to the second portion between an open position and a closed position. The self-close mechanism applies a closing force on the first portion from a first angle of rotation between the first portion and the second portion to the closed position, the closing force urging the first portion to the closed position. The slow-close mechanism applies a damping force on the first portion from a second angle of rotation between the first portion and the second portion to the closed position, the damping force slowing a rotational speed of the first portion to the closed position.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
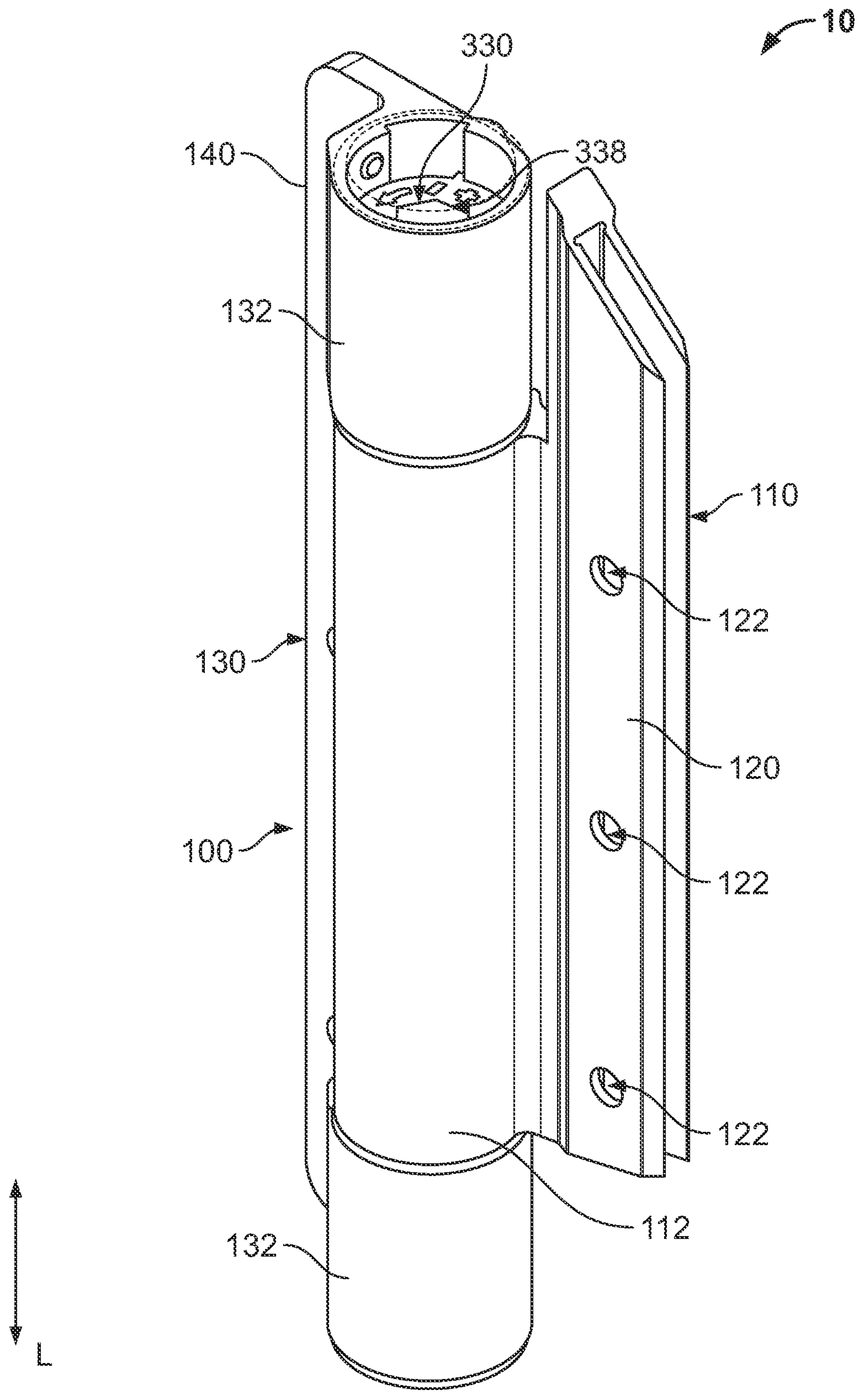
FIG. 1 is a perspective view of a hinge according to an embodiment.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art. In addition, in the following detailed description, for purposes of explanation, numerous specific details are set forth to provide a thorough understanding of the disclosed embodiments. However, it is apparent that one or more embodiments may also be implemented without these specific details.

Throughout the drawings, only one of a plurality of identical elements may be labeled in a figure for clarity of the drawings, but the detailed description of the element herein applies equally to each of the identically appearing elements in the figure. Throughout the specification, directional descriptors are used such as "longitudinal axis". These descriptors are merely for clarity of the description and for differentiation of the various directions. These directional descriptors do not imply or require any particular orientation of the disclosed elements. Throughout the specification, the term "approximately" is intended to mean+/−10% of the listed quantity.

Figure 2:
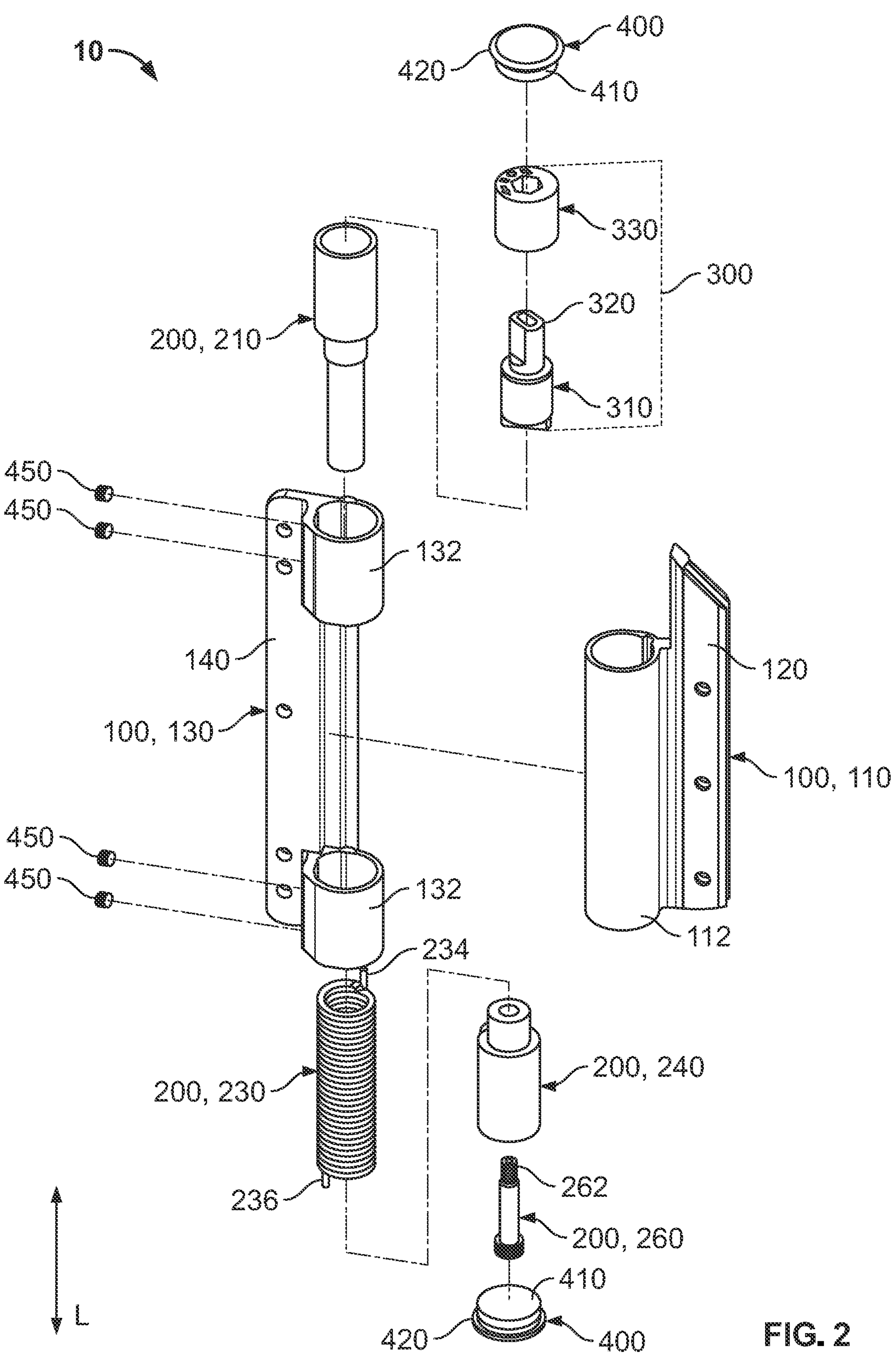
FIG. 2 is an exploded perspective view of the hinge.

A hinge 10 according to an embodiment is shown in FIGS. 1 and 2. The hinge 10 includes a hinge body 100, a self-close mechanism 200 disposed in the hinge body 100, and a slow-close mechanism 300 disposed in the hinge body 100. The structural details of the hinge 10 will be described in greater detail below, followed by a description of the function of the hinge 10 as applied in an exemplary door assembly 20.

The hinge body 100, as shown in FIGS. 1 and 2, has a first portion 110 and a second portion 130.

Figure 3:
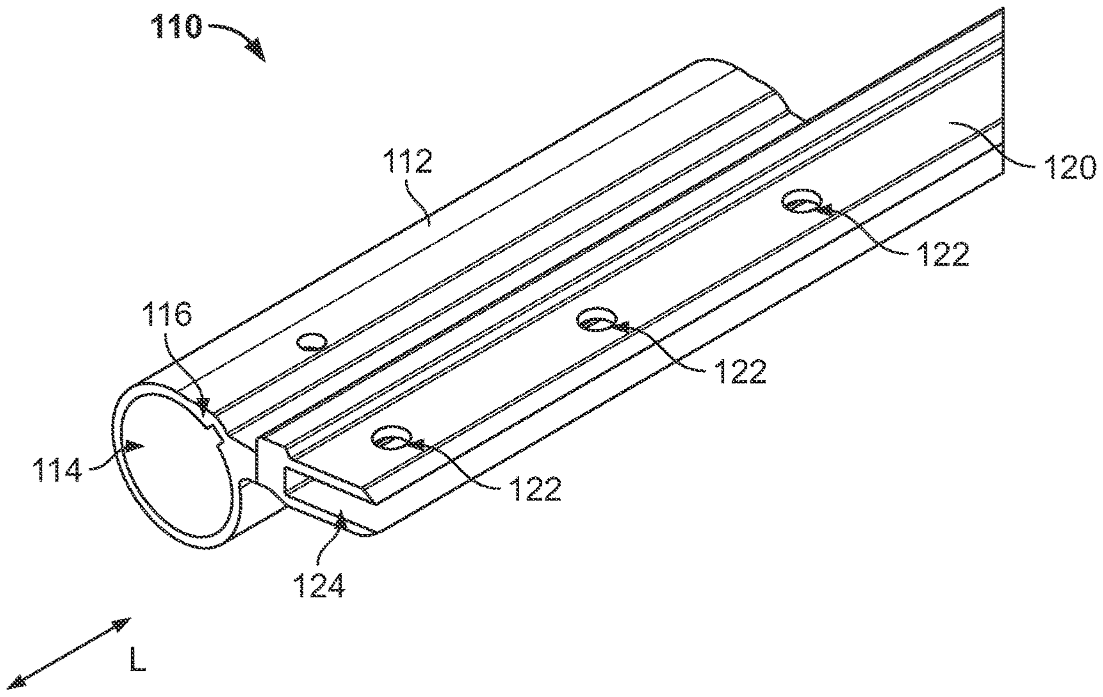
FIG. 3 is a perspective view of a first portion of a hinge body of the hinge.

The first portion 110, shown in detail in FIG. 3, has a first housing 112 and a first flange 120 extending from the first housing 112. The first housing 112 has a cylindrical shape defining a first receiving space 114 extending through the first housing 112 along a longitudinal axis L. The first housing 112 has a notch 116 on a surface facing the first receiving space 114. The notch 116 extends along the longitudinal axis L on the surface of the first housing 112. The first flange 120 defines a channel 124 and has a plurality of first fastener openings 122 extending through the first flange 120.

The first portion 110 may be formed from a metal, such as aluminum, a plastic, or any other rigid, resilient material. In the shown embodiment, the first portion 110, including the first housing 112 and the first flange 120, is monolithically formed in a single piece. In other embodiments, the first portion 110 can be formed in a plurality of pieces and assembled together to form the first portion 110 shown and described herein.

Figure 4:
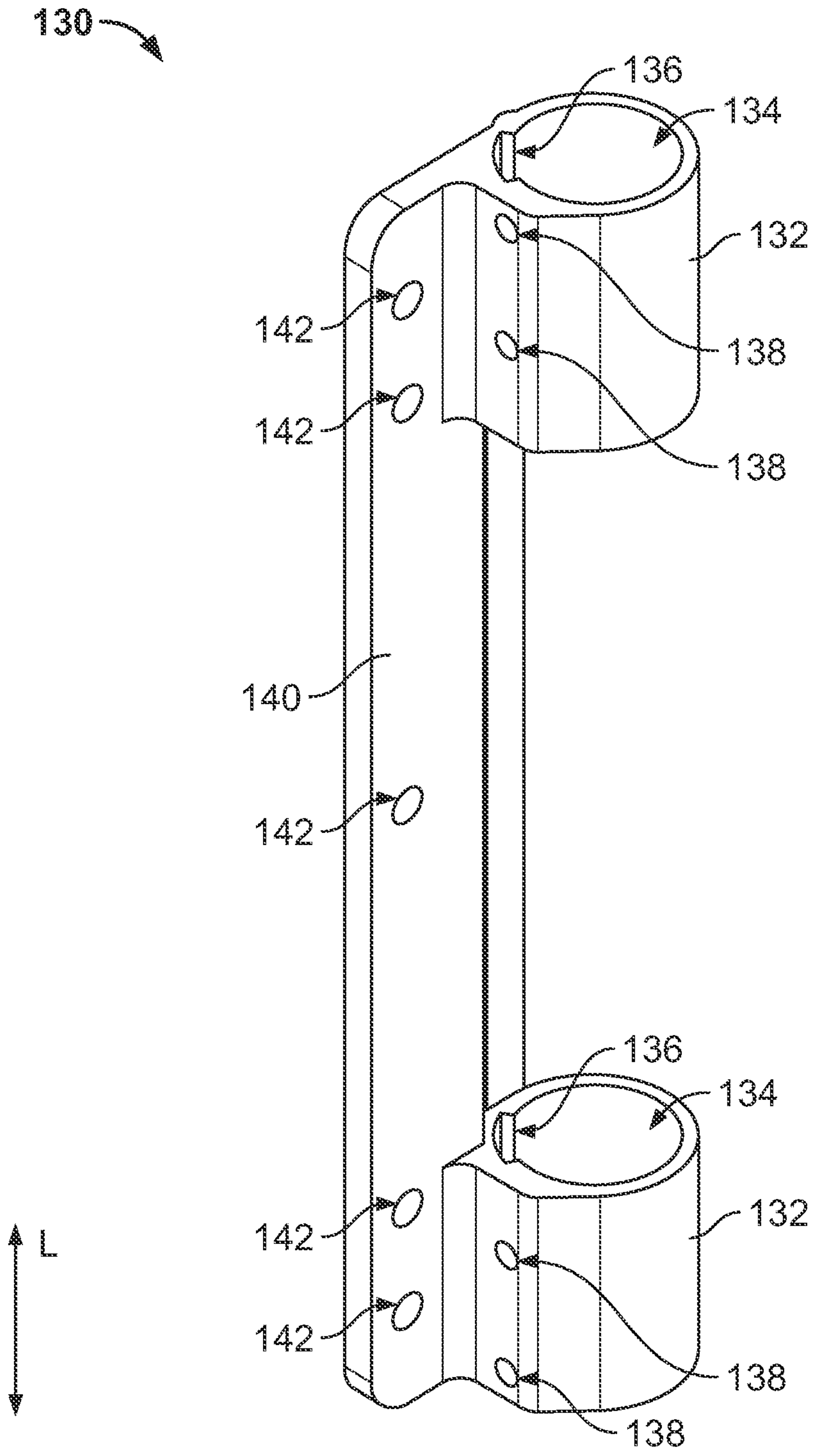
FIG. 4 is a perspective view of a second portion of the hinge body.

The second portion 130, shown in detail in FIG. 4, has a pair of second housings 132 connected by a second flange 140. The second housings 132 each have a cylindrical shape defining a second receiving space 134 extending through the second housing 132 along the longitudinal axis L. The second housings 132 each have an indent 136 on a surface of the second housing 132 facing the second receiving space 134; the indent 136 extends through a portion of a circumference of the surface of the second housing 132 facing the second receiving space 134. The second housings 132 each have a plurality of set openings 138 extending through the second housings 132 perpendicular to the longitudinal axis L and communicating with the second receiving space 134. The second flange 140 has a plurality of second fastener openings 142 extending through the second flange 140.

The second portion 130 may be formed from a metal, such as aluminum, a plastic, or any other rigid, resilient material. The second portion 130 may be formed from a same material as the first portion 110. In the shown embodiment, the second portion 130, including the second housings 132 and the second flange 140, is monolithically formed in a single piece. In other embodiments, the second portion 130 can be formed in a plurality of pieces and assembled together to form the second portion 130 shown and described herein.

The self-close mechanism 200, as shown in FIG. 2, includes a center pin 210, a bottom pin 240, and a torsion spring 230 held between the center pin 210 and the bottom pin 240.

Figure 5A:
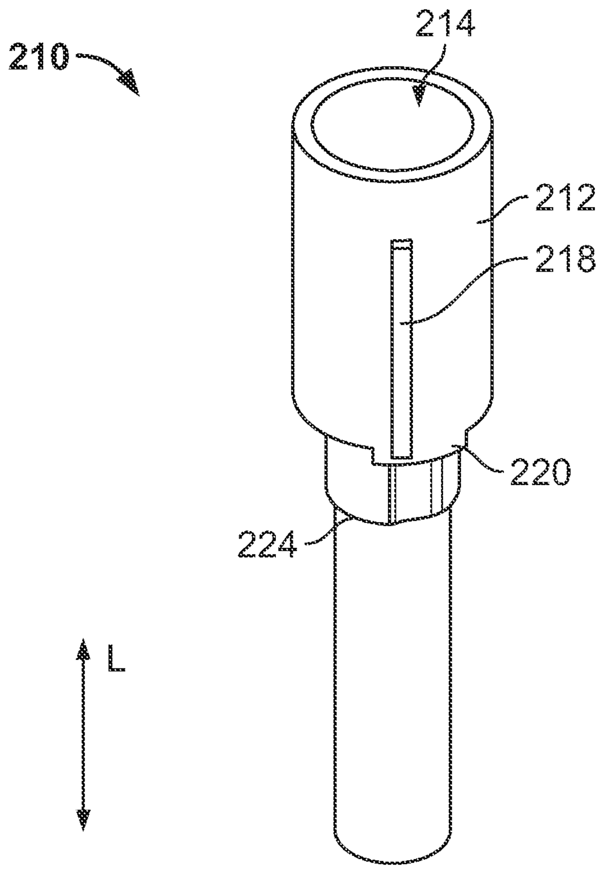
FIG. 5A is a perspective view of a center pin of a self-close mechanism of the hinge.
Figure 5B:
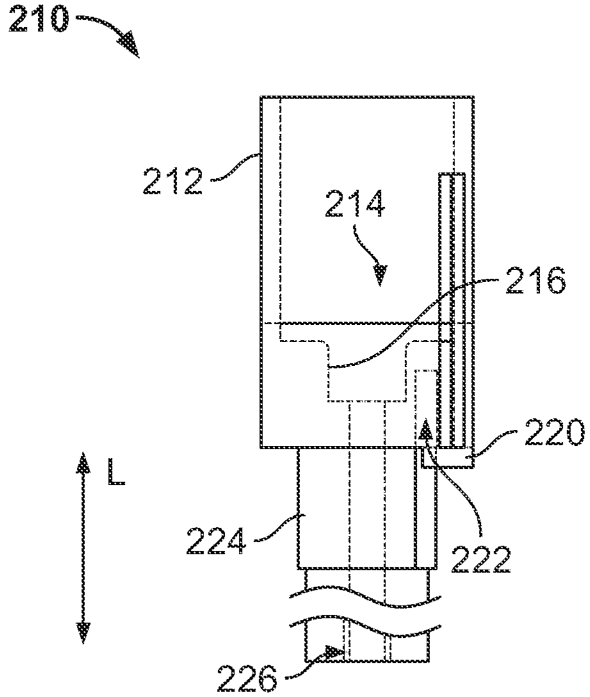
FIG. 5B is a sectional side view of the center pin.

The center pin 210 is shown in detail in FIGS. 5A and 5B. The center pin 210 has an upper portion 212 and a shaft 224 extending from the upper portion 212 along the longitudinal axis L. The upper portion 212 and the shaft 224 each have a cylindrical shape.

The upper portion 212 defines a damper receiving space 214 within the upper portion 212. The damper receiving space 214, as shown in FIG. 5B, has a step 216 that decreases a size of a portion of the damper receiving space 214. The upper portion 212, as shown in FIG. 5A, has a pin protrusion 218 extending from an outer surface of the upper portion 212; the pin protrusion 218 extends on the outer surface along the longitudinal axis L.

On a bottom surface of the upper portion 212 from which the shaft 224 extends, the upper portion 212 has an upper lip 220 extending along the longitudinal axis L, as shown in FIGS. 5A and 5B. The upper lip 220 is spaced apart from the shaft 224 and forms a gap between the shaft 224 and the upper lip 220. The upper portion 212 has a first spring passageway 222 extending into the bottom surface of the upper portion 212 along the longitudinal axis L, as shown in FIG. 5B. The first spring passageway 222 only extends partway into the upper portion 212 along the longitudinal axis L and, in the shown embodiment, does not communicate with the damper receiving space 214.

The shaft 224, as shown in FIGS. 5A and 5B, extends from the upper portion 212 and is narrower than the upper portion 212. The center pin 210 has a center pin passageway 226 extending through the upper portion 212 and the shaft 224 along the longitudinal axis L and communicating with the damper receiving space 214.

The center pin 210 may be formed from a self-lubricating plastic, such as a glass-filled nylon. In other embodiments, the center pin 210 may be formed from any type of plastic. The center pin 210, in the shown embodiment, is monolithically formed in a single piece from the self-lubricating plastic. In other embodiments, the center pin 210 can be formed in a plurality of pieces and assembled together to form the center pin 210 shown and described herein.

The torsion spring 230, as shown in FIG. 2, has a plurality of coils 232 extending between a first end 234 and a second end 236 opposite the first end 234 along the longitudinal axis L. The number of coils 232 in the torsion spring 230 may vary in different embodiments. The torsion spring 230, by the coils 232, exerts a torque or twisting force when twisted about the longitudinal axis L. The first end 234 and the second end 236 are each a straight segment of the torsion spring 230 that extends beyond the coils 232 parallel to the longitudinal axis L.

Figure 6A:
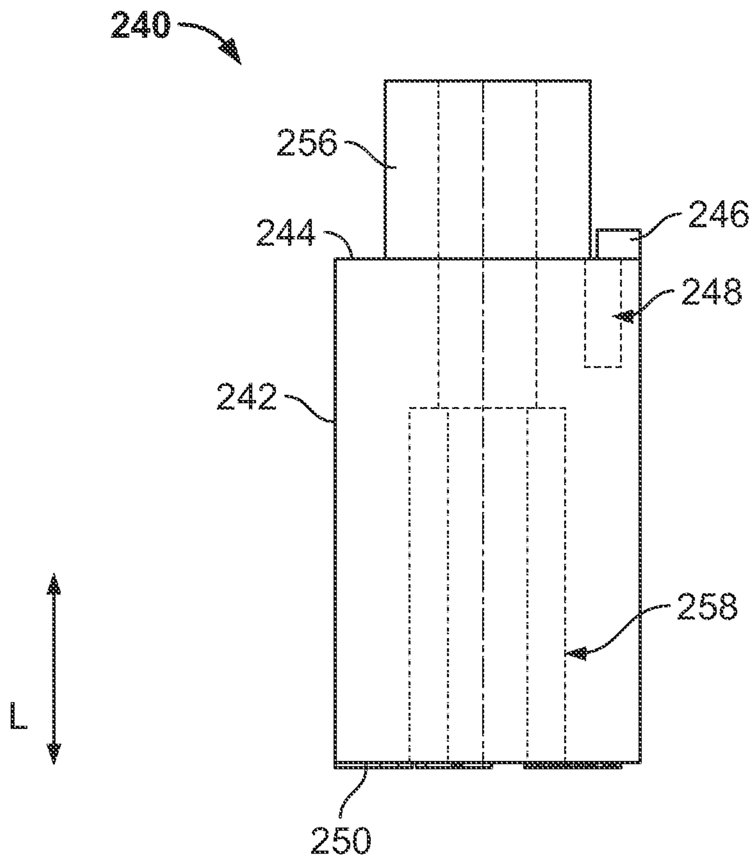
FIG. 6A is a sectional side view of a bottom pin of the self-close mechanism.
Figure 6B:
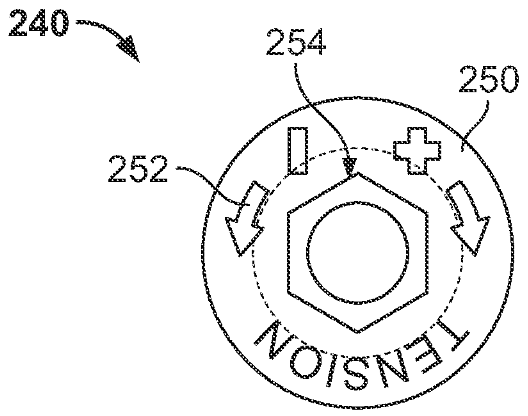
FIG. 6B is a bottom view of the bottom pin.

The bottom pin 240 is shown in detail in FIGS. 6A and 6B. The bottom pin 240 has a base 242 and a post 256 extending from the base 242 along the longitudinal axis L. The base 242 and the post 256 each have a cylindrical shape. The bottom pin 240 has a bottom pin passageway 258 extending through the base 242 and the post 256 along the longitudinal axis L.

The base 242 has an upper surface 244 and a lower surface 250 opposite the upper surface 244 along the longitudinal axis L. The upper surface 244, as shown in FIG. 6A, has a lower lip 246 protruding from the upper surface 244 along the longitudinal axis L and a second spring passageway 248 extending into the upper surface 244 along the longitudinal axis L. The lower lip 246 is spaced apart from the post 256 and forms a gap between the lower lip 246 and the post 256. The second spring passageway 248 extends partially into the upper surface 244 but does not communicate with bottom pin passageway 258.

On the lower surface 250, as shown in FIG. 6B, the bottom pin 240 has a bottom pin receiving opening 254 that communicates with the bottom pin passageway 258. The bottom pin receiving opening 254 is shaped to receive a tool that can be used to rotate the bottom pin 240; in the shown embodiment, the bottom pin receiving opening 254 is hexagonal and is capable of receiving a hexagonal Allen wrench. In other embodiments, the bottom pin receiving opening 254 can have different shapes to receive different tools. The bottom pin 240 has a tension indicator 252 on the lower surface 250 that indicates tension changes resulting from relative rotation of the bottom pin 240, as described in greater detail below.

The bottom pin 240 may be formed from a self-lubricating plastic, such as a glass-filled nylon. In other embodiments, the bottom pin 240 may be formed from any type of plastic. The bottom pin 240, in the shown embodiment, is monolithically formed in a single piece from the self-lubricating plastic. In other embodiments, the bottom pin 240 can be formed in a plurality of pieces and assembled together to form the bottom pin 240 shown and described herein.

As shown in FIG. 2, the self-close mechanism 200 has an attachment screw 260 that is used to secure the elements of the self-close mechanism 200 together, as described in greater detail below. The attachment screw 260 has a thread 262 at an end along the longitudinal axis L.

The slow-close mechanism 300, as shown in FIG. 2, includes a damping element 310, a shaft 320 disposed in the damping element 310 and rotatable with respect to the damping element 310, and a damper stop 330 disposed on the shaft 320. The damping element 310 has a bar 312 that protrudes from an end of the damping element 310 opposite the shaft 320 along the longitudinal axis L.

Figure 7:
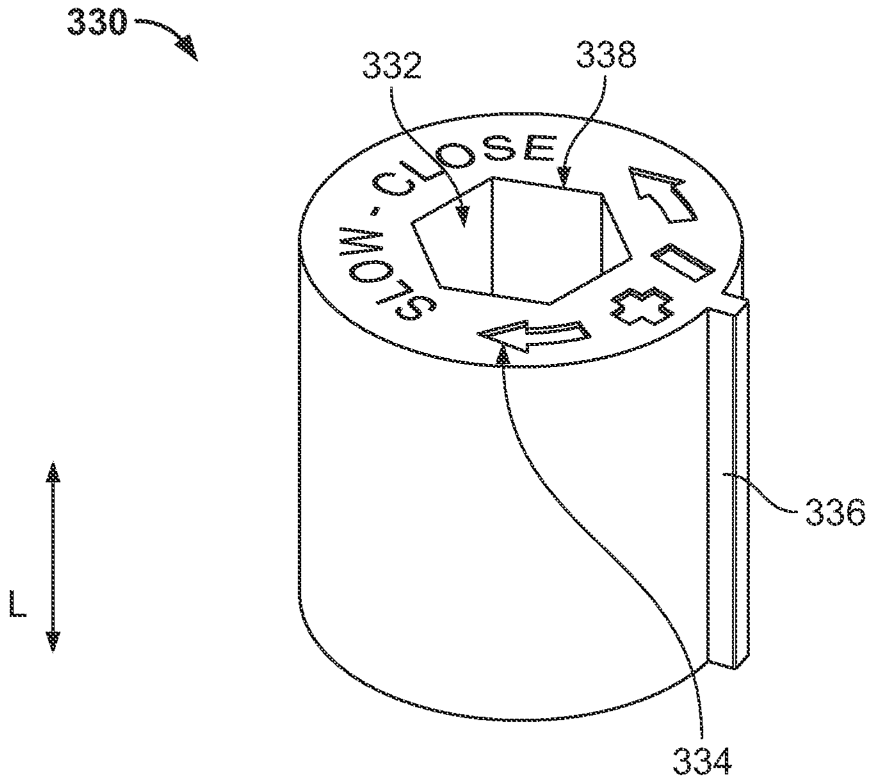
FIG. 7 is a perspective view of a damper stop of a slow-close mechanism of the hinge.

The damper stop 330 is shown in greater detail in FIG. 7. The damper stop 330 is cylindrical and has a shaft passageway 332 extending through the damper stop 330 with a damper receiving opening 338 at an end of the shaft passageway 332. The damper stop 330 has a damper indicator 334 on an upper surface extending around the damper receiving opening 338. The damper receiving opening 338 is shaped to receive a tool that can be used to rotate the damper stop 330; in the shown embodiment, the damper receiving opening 338 is hexagonal and is capable of receiving a hexagonal Allen wrench. In other embodiments, the damper receiving opening 338 can have different shapes to receive different tools. The damper indicator 334 indicates damping changes resulting from relative rotation of the damper stop 330, as described in greater detail below. The damper stop 330 has a damper protrusion 336 protruding from an outer surface of the damper stop 330 and extending along the longitudinal axis L.

The damper stop 330 may be formed from a self-lubricating plastic, such as a glass-filled nylon. In other embodiments, the damper stop 330 may be formed from any type of plastic. The damper stop 330, in the shown embodiment, is monolithically formed in a single piece from the self-lubricating plastic. In other embodiments, the damper stop 330 can be formed in a plurality of pieces and assembled together to form the damper stop 330 shown and described herein.

In the embodiment shown in FIG. 2, the hinge 10 further includes a pair of caps 400. Each of the caps 400 has a body 410 and a head 420 at an end of the body 410 along the longitudinal axis L. The head 420 is wider than the body 410. Each of the caps 400 is formed of a same material as the first portion 110 and the second portion 130 of the hinge body 100.

The assembly of the hinge body 100, the self-close mechanism 200, and the slow-close mechanism 300 described above to form the hinge 10 will now be described in greater detail primarily with reference to FIGS. 8 and 9.

Figure 8:
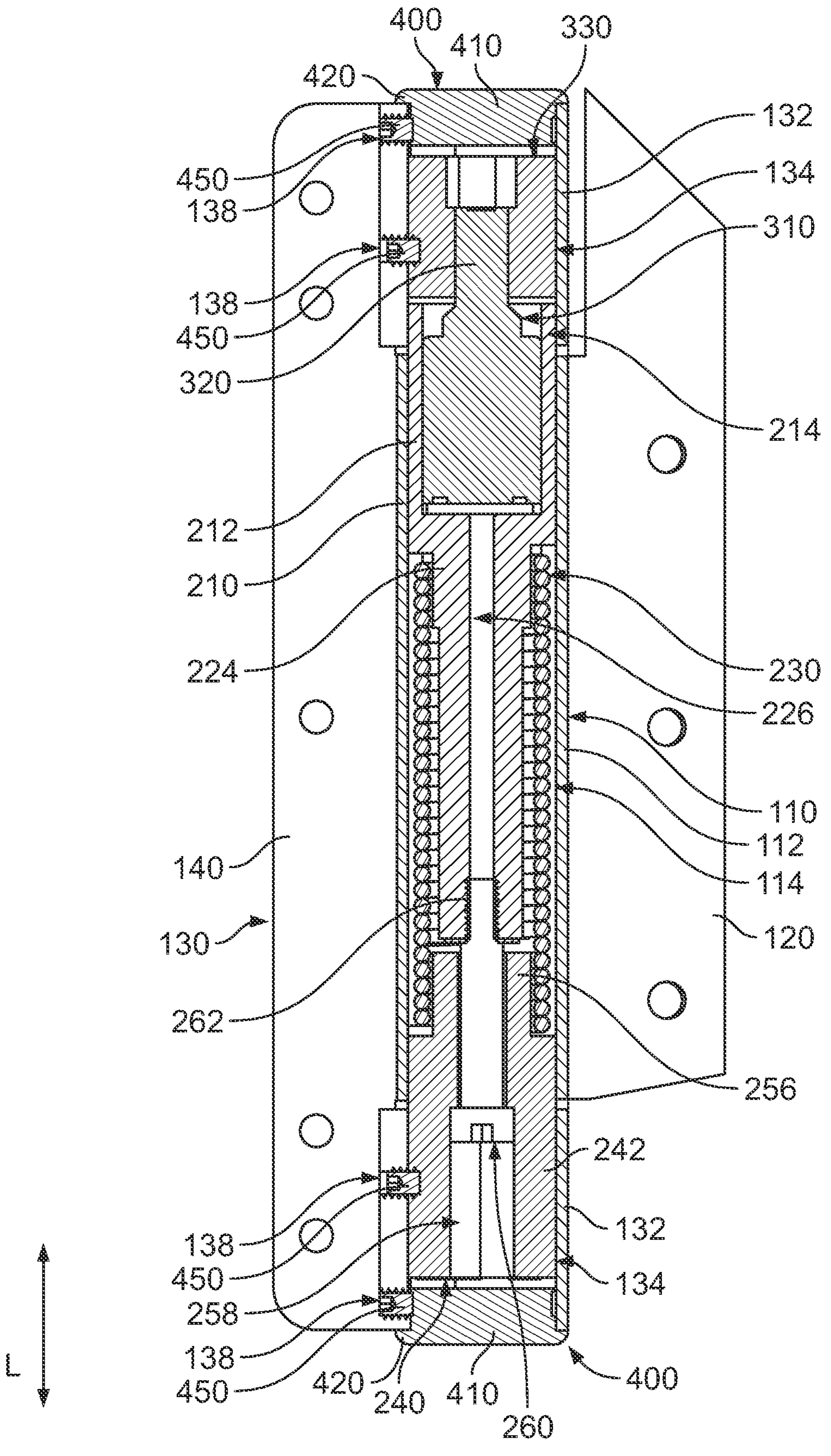
FIG. 8 is a sectional side view of the hinge.
Figure 9:
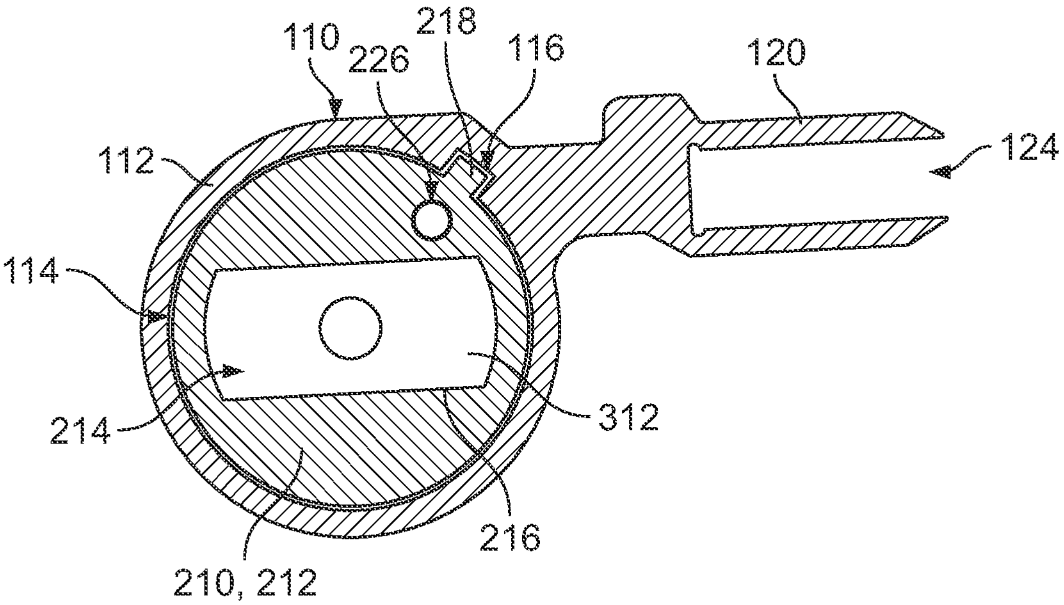
FIG. 9 is a sectional top view of the hinge.

The first portion 110 is nested with the second portion 130 to form the hinge body 110, as shown in FIGS. 1 and 8. The first housing 112 is positioned between the second housings 132 and the first receiving space 114 is aligned with the second receiving spaces 134 along the longitudinal axis L. The first portion 110 is rotatable with respect to the second portion 130 about the longitudinal axis L while the housings 112, 132 and the receiving spaces 114, 134 remain in alignment.

The self-close mechanism 200 and the slow-close mechanism 300 are positioned in the first receiving space 114 of the first housing 112 and the second receiving spaces 134 of the second housings 132, as shown in FIG. 8.

As shown in FIG. 8, the upper portion 212 of the center pin 210 is positioned in the second receiving space 134 of one of the second housings 132 and in the first receiving space 114 of the first housing 112. The shaft 224 extending from the upper portion 212 is positioned within the first receiving space 114 of the first housing 112. The pin protrusion 218 on the upper portion 212 is received in the notch 116 of the first housing 112, as shown in FIG. 9. By engagement of the pin protrusion 218 with the notch 116, the center pin 210 and the first portion 110 are rotationally fixed to one another; rotation of the first portion 110 about the longitudinal axis L correspondingly rotates the center pin 210 about the longitudinal axis L.

The torsion spring 230, as shown in FIG. 8, is positioned around the shaft 224 of the center pin 210 and around the post 256 of the bottom pin 240. The first end 234 of the torsion spring 230 is positioned in the first spring passageway 226 of the center pin 210, shown in FIG. 9, and the second end 236 of the torsion spring 230 is positioned in the second spring passageway 248 of the bottom pin 240, shown in FIG. 6A. The positioning of the ends 234, 236 of the torsion spring 230 in the spring passageways 226, 248 fixes the torsion spring 230 to the center pin 210 and the bottom pin 240. As the torsion spring 230 is fixed to the center pin 210 and the bottom pin 240, rotation of the center pin 210 and the bottom pin 240 with respect to one another about the longitudinal axis L causes the torsion spring 230 to impart a proportional torque or twisting force about the longitudinal axis L. In the shown embodiment, the upper lip 220 of the center pin 210 and the lower lip 246 of the base 242 aid in positioning and securing the torsion spring 230 between the center pin 210 and the bottom pin 240 around the shaft 224 and the post 256.

The bottom pin 240, as shown in FIG. 8, is positioned with the base 242 in the second receiving space 134 of one of the second housings 132 and extending into the first receiving space 114 of the first housing 112. The post 256 extends from the base 242 within the first receiving space 114 of the first housing 112. The bottom pin 240 is rotatable about the longitudinal axis L with respect to the first portion 110 and the second portion 120.

As shown in FIG. 8, the attachment screw 260 of the self-close mechanism 200 is positioned within the bottom pin passageway 258 of the bottom pin 240 and extends into the center pin passageway 226 of the center pin 210. The thread 262 of the attachment screw 260 engages the center pin 210 to connect the bottom pin 240 and the center pin 210 with the torsion spring 230 held between. The portion of the attachment screw 260 positioned within the bottom pin 240 does not have a thread, and the bottom pin 240 is rotatable about the attachment screw 260.

The damper stop 330 of the slow-close mechanism 300, as shown in FIG. 8, is disposed on the shaft 320, with the shaft 320 positioned in the shaft passageway 332. The damping element 310 is positioned in the damper receiving space 214 in the upper portion 212 of the center pin 210. The bar 312 of the damping element 310 is received in the step 216 of the damper receiving space 214, as shown in FIG. 9, such that the damping element 310 is rotationally fixed to the center pin 210 and, via the center pin 210, is rotationally fixed to the first portion 110.

Figure 12A:
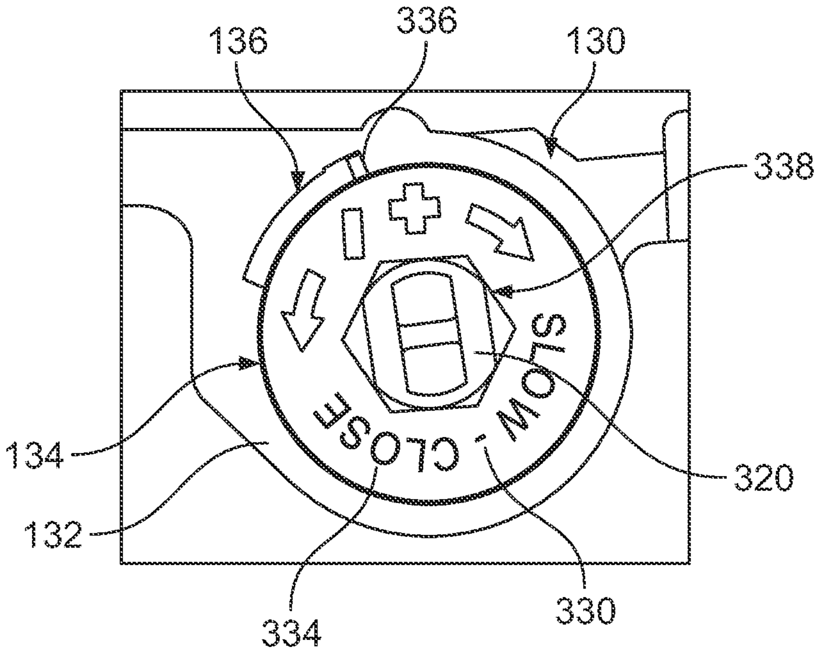
FIG. 12A is a top view of the damper stop in the hinge in a first position.
Figure 12B:
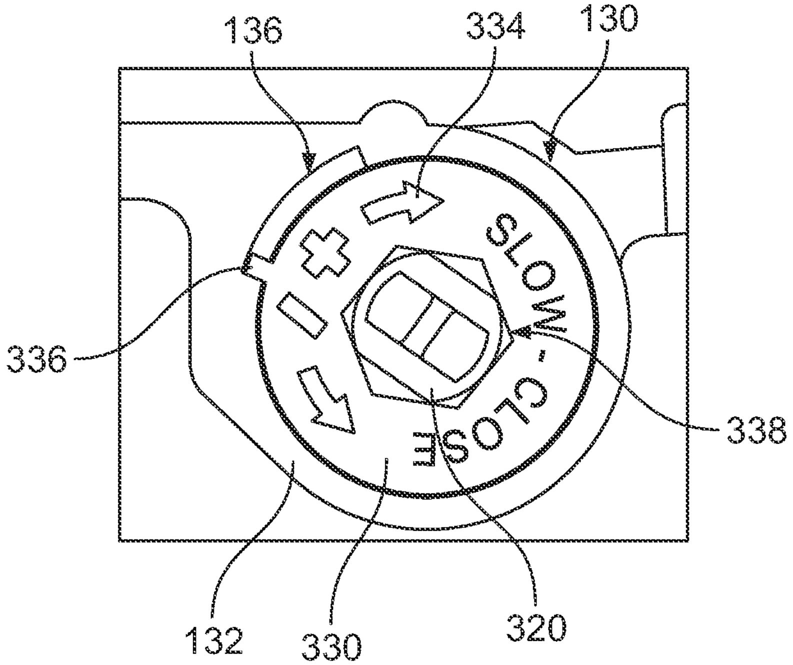
FIG. 12B is a top view of the damper stop in the hinge in a second position.

The shaft 320 and the damper stop 330 on the shaft 320 are positioned in the second receiving space 134 of one of the second housings 132, as shown in FIG. 8. The damper protrusion 337 is received in the indent 136 of the second housing 132 of the second portion 130, as shown in FIGS. 12A and 12B. The damper stop 330 is rotatable with respect to the second portion 130 within a range shown in FIGS. 12A and 12B defined by engagement of the damper protrusion 337 with the indent 136. The shaft 320 and the damper stop 330 on the shaft 320 are rotatable with respect to the second portion 130 within the range of the indent 136 and are rotatable with respect to the damping element 310, which is rotationally fixed to the first portion 110.

As shown in FIG. 8, the caps 400 are positioned on the second housings 132, connected to opposite ends of the hinge body 100 along the longitudinal axis L. The body 410 of each of the caps 400 is positioned in the second receiving space 134 of one of the second housings 132 and the head 420 of each of the caps 400 abuts an outer surface of the one of the second housings 132. The self-close mechanism 200 and the slow-close mechanism 300 are enclosed within the first portion 110, the second portion 130, and the caps 400.

In the embodiment shown in FIG. 8, a plurality of set screws 450 are used to secure the cap 400 and elements of the self-close mechanism 200 and the slow-close mechanism 300 in position. The set screws 450 are positioned in the set openings 138 in the second housings 132 and can be tightened and loosened to hold the caps 400, rotationally secure the damper stop 330, and rotationally secure the bottom pin 240 as desired.

Figure 10:
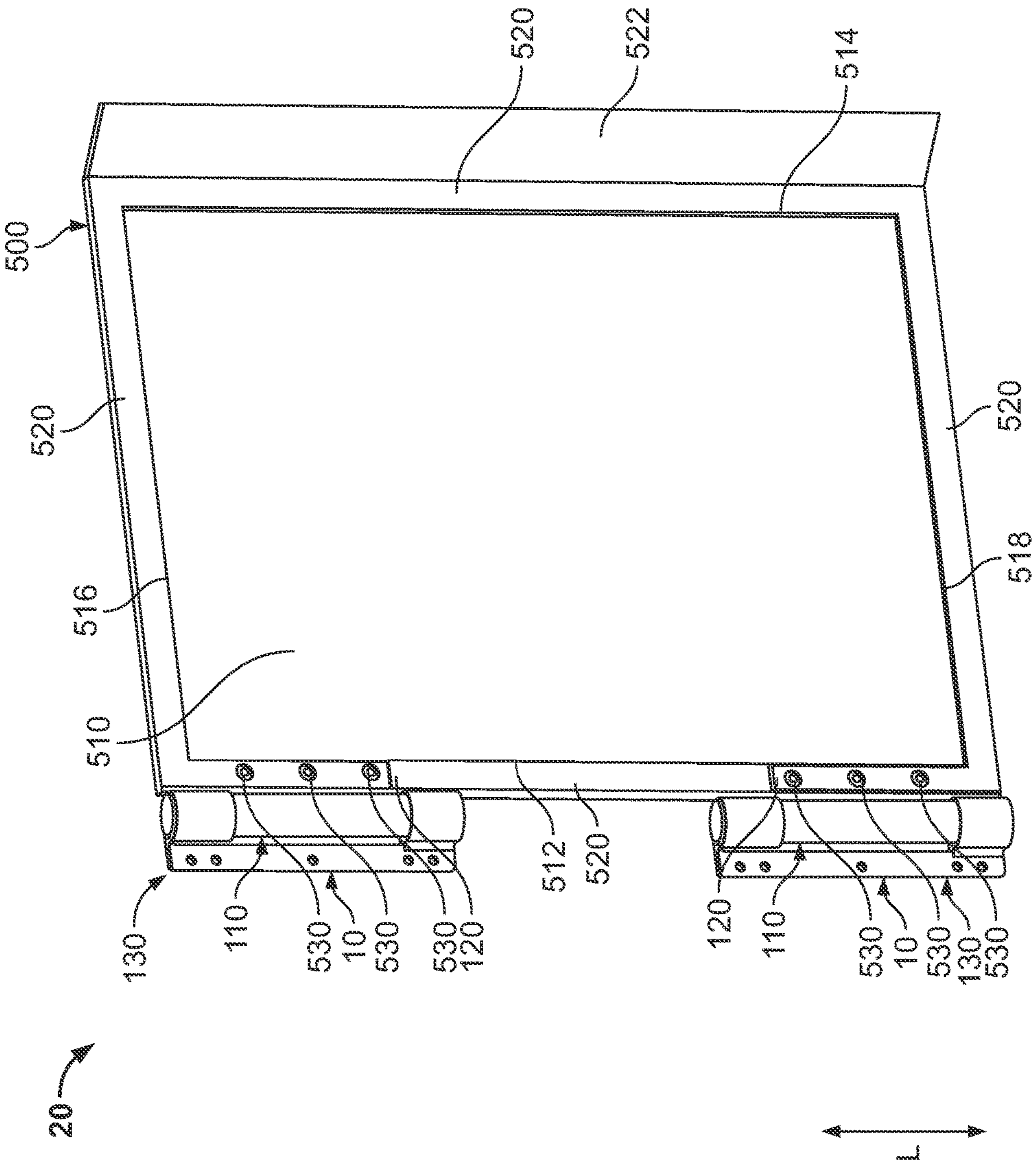
FIG. 10 is a perspective view of a door assembly according to an embodiment.

The hinge 10 is shown as part of a door assembly 20 in FIG. 10. The door assembly 20 includes a door 500 and at least one hinge 10 attached to the door 500. In the shown embodiments, the door assembly 20 has two hinges 10 attached to the door 500. In other embodiments, the door assembly 20 may have one or three or more hinges 10 attached to the door 500, depending on the application.

The door 500 includes a panel 510, a plurality of frame pieces 520 disposed around the panel 512, and a plurality of fasteners 530 attaching the hinge 10 to the door 500. As shown in FIG. 10, the panel 510 has a hinge side 512, a free side 514 opposite the hinge side 512, a top side 516, and a bottom side 518 opposite the top side 516. In an embodiment, the panel 512 is formed of a transparent material, such as plexiglass. In another embodiment, the panel 512 may be formed of an opaque or translucent material, such as any other type of plastic or metal.

The frame pieces 520 are each attached to one of the sides 512, 514, 516, 518. The frame pieces 520 may be formed of a same material as the hinge body 100, such as aluminum. In the shown embodiment, the frame piece 520 on the free side 514 of the panel 510 has an angled flange 522 that extends at an angle away from the panel 510. In other embodiments, the frame pieces 520, including the frame piece 520 with the angled flange 522, can be omitted.

As shown in FIG. 10, the hinges 10 are attached to the hinge side 512 of the panel 510. The panel 510 is positioned in the channel 124 of the first flange 120 of the first portion 110 and the fasteners 530 are positioned in the first fastener openings 122 to secure the first flange 120 to the panel 510. In the shown embodiment, the fasteners 530 are screws.

Figure 11:
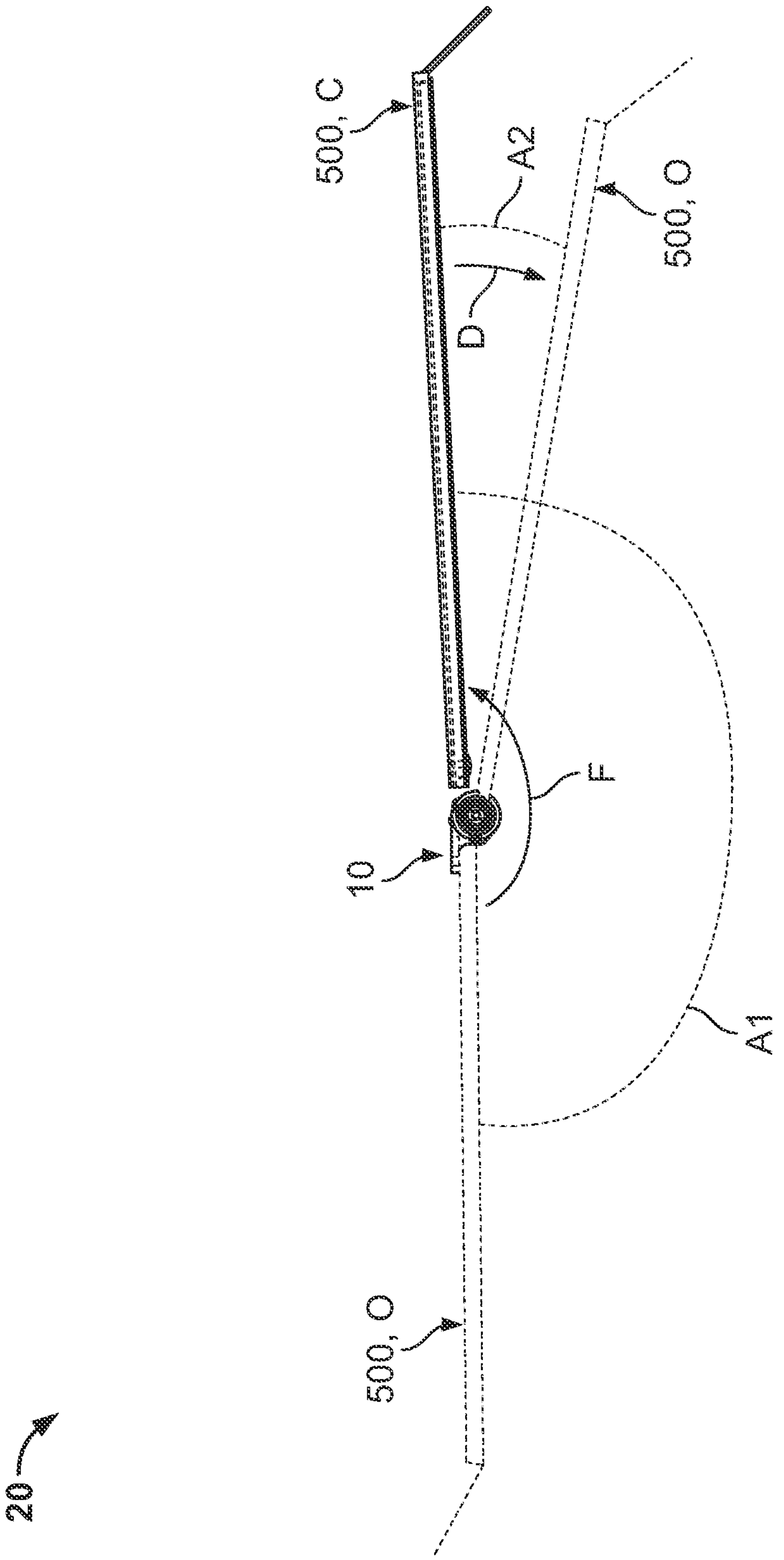
FIG. 11 is a schematic top view of a plurality of positions of the door assembly including a door and the hinge.

The function of the hinge 10 will now be described in greater detail in the context of the door assembly 20 and with reference to FIGS. 11, 12A, and 12B. FIG. 11 shows the door assembly 20 with the hinge 10 and the door 500 in three different exemplary rotational positions. The door 500 is shown dashed in two of the positions to avoid confusion; only one door 500 is attached to the hinge 10 but shown in the three positions described below. The door 500 and the hinge 10 are shown in a closed position C and two open positions O in FIG. 11. When the door 500 and the hinge 10 are rotated, the first portion 110 of the hinge body 100 rotates with respect to the second portion 130 of the hinge body 100 about the longitudinal axis L to the rotational angles described herein.

The self-close mechanism 200 applies a closing force F, shown in FIG. 11, on the first portion 110 from a first angle of rotation A1 between the first portion 110 and the second portion 130 to the closed position C. The first angle of rotation A1 is approximately 180° and, in the closed position C, the first portion 110 and the second portion 130 have a 0° angle of rotation. The self-close mechanism 200 acts to move the hinge 10 and the door 500 from a fully 180° open position O to the closed position C without intervention by a user. The torsion spring 230 fixed between the center pin 210 and the bottom pin 240 is loaded as the first portion 110 rotates away from the closed position C; when the door 500 and the hinge 10 are released from the open position O up to the first angle of rotation A1, the torsion spring 230 provides the closing force F as a restoring force of the torsion spring 230 that acts to move the first portion 110 and the door 500 to the closed position C. In the closed position C, the torsion spring 230 still provides the closing force F that acts to hold the hinge 10 and the door 500 in the closed position C.

The self-close mechanism 200 is adjustable to adjust a magnitude of the closing force F. A user can insert a tool, such as an Allen wrench, into the bottom pin receiving opening 254 of the bottom pin 240 by removing one of the caps 400 and can use the tool to rotate the bottom pin 240 with respect to the hinge body 100. As shown by the tension indicator 252 of the bottom pin 240 in FIG. 6B, rotation of the bottom pin 240, which is fixed to the torsion spring 230, in opposite directions rotates the torsion spring 230 and either tightens the torsion spring 230 and provides a higher closing force For loosens the torsions spring 230 and provides a lower closing force F. The set screw 450 can then be used to hold the bottom pin 240 in the desired position in the second portion 130.

The slow-close mechanism 300 applies a damping force D, shown in FIG. 11, on the first portion 110 that acts counter to the closing force F from a second angle of rotation A2 between the first portion 110 and the second portion 130 to the closed position C. In the shown embodiment, the second angle of rotation A2 is less than or equal to 45°. In other embodiments, the second angle of rotation A2 can be less than or equal to 35°. When the second portion 130 reaches the second angle of rotation A2 during movement to the closing position C, the damping element 310 engages and, as the damper stop 330 on the shaft 320 is rotationally fixed to the second portion 130 of the hinge body 100 and the damping element 310 is rotationally fixed to the first portion 110 of the hinge body 100, as shown in FIG. 8 and described above, the damping element 310 impedes and slows rotation of the shaft 320 within the damping element 310 to provide the damping force D. The damping element 310 and the shaft 320 allow the slow-close mechanism 300 to act as a rotary damper. The damping force D slows a rotational speed of the first portion 110 and the door 500 from the second angle of rotation A2 to the closed position C.

The slow-close mechanism 300 is adjustable to adjust the second angle of rotation A2 at which the damping force D is applied. A user can insert a tool, such as an Allen wrench, into the damper receiving opening 338 of the damper stop 330 by removing one of the caps 400 and can use the tool to rotate the damper stop 330 with respect to the hinge body 100. The rotation of the damper stop 330, as shown in FIGS. 12A and 12B, is limited within a range by movement of the damper protrusion 336 within the indent 136 of the second housing 132. As shown by the damper indicator 334 of the damper stop 330, rotation of the damper stop 330, which is fixed to the shaft 320, in opposite directions rotates the shaft 320 within the damping element 310, changing the second angle of rotation A2 at which the damping force D is applied. In an embodiment, the second angle of rotation A2 can be adjusted to any angle less than or equal to approximately 45°. The set screw 450 can then be used to hold the damper stop 330 in the desired position in the second portion 130.

The hinge 10 controls rotational movement of the door 500 as described above. In an embodiment in which the door 500 has two or more hinges 10, as shown in FIG. 10, the closing force F and/or the second angle of rotation A2 of each of the hinges 10 can be set to be different from one another by independently adjusting the self-close mechanism 200 and the slow-close mechanism 300 of each of the hinges 10.

The hinge 10 according to the above-described embodiments fully self-closes from 180° open while soft-closing for a portion of the open range to close. The self-closing mechanism 200 eases use of the hinge 10 by the operator, who does not need to manually close the door 500 attached to the hinge 10, and the slow-close mechanism 300 avoids disruptive noises that can occur when a door 500 self-closes from a large opening angle. Further, both the closing force F of the self-closing mechanism 200 and the initiation angle of the slow-close mechanism 300 are adjustable, allowing the user to control the speed of the hinge 10 moving to the closed position C and the slowing that occurs before reaching the closed position C. The hinge body 100 with the caps 400 fully encloses the self-close mechanism 200 and the slow-close mechanism 300 to prevent environmental damage and increase the useful life of the hinge 10.

What is claimed is:

1. A hinge, comprising:

a hinge body having a first portion and a second portion, the first portion is rotatable with respect to the second portion between an open position and a closed position;

a self-close mechanism disposed within the hinge body, the self-close mechanism applies a closing force on the first portion from a first angle of rotation between the first portion and the second portion to the closed position having a 0° angle of rotation between the first portion and the second portion, the closing force urging the first portion to the closed position, the first angle of rotation is approximately 180°; and a slow-close mechanism disposed within the hinge body, the slow-close mechanism applies a damping force on the first portion from a second angle of rotation between the first portion and the second portion to the closed position, the damping force slowing a rotational speed of the first portion to the closed position, the second angle of rotation is less than or equal to 45°.

2. The hinge of claim 1, wherein the self-close mechanism is adjustable to adjust a magnitude of the closing force.

3. The hinge of claim 1, wherein the slow-close mechanism is adjustable to adjust the second angle of rotation at which the damping force is applied.

4. The hinge of claim 1, wherein the self-close mechanism includes a center pin, a bottom pin, and a torsion spring held between the center pin and the bottom pin.

5. The hinge of claim 4, wherein the torsion spring has a first end fixed to the center pin and a second end fixed to the bottom pin.

6. The hinge of claim 5, wherein the bottom pin is rotatable within the hinge body to adjust the closing force by rotating the torsion spring.

7. The hinge of claim 6, wherein the bottom pin has a base and a post extending from the base, the torsion spring is fixed to the base and positioned around the post.

8. The hinge of claim 6, wherein the self-close mechanism has an attachment screw positioned within the bottom pin and the center pin and connecting the bottom pin and the center pin.

9. The hinge of claim 5, wherein the center pin has an upper portion and a shaft extending from the upper portion, the torsion spring is positioned around the shaft.

10. The hinge of claim 9, wherein the upper portion has a pin protrusion received in a notch of the first portion of the hinge body, the center pin rotates with the first portion by engagement of the pin protrusion with the notch.

11. The hinge of claim 1, wherein the slow-close mechanism has a damping element and a shaft disposed in the damping element and rotatable with respect to the damping element.

12. The hinge of claim 11, wherein the damping element is rotationally fixed to the first portion of the hinge body.

13. The hinge of claim 12, wherein the slow-close mechanism has a damper stop disposed on the shaft, the damper stop has a damper protrusion received in an indent of the second portion of the hinge body.

14. The hinge of claim 13, wherein the damper stop is rotatable with respect to the second portion of the hinge body within a range defined by engagement of the damper protrusion with the indent, the damper stop is rotatable within the range to adjust the second angle of rotation by rotating the shaft within the damping element.

15. The hinge of claim 11, wherein the slow-close mechanism is a rotary damper.

16. The hinge of claim 1, further comprising a pair of caps connected to opposite ends of the hinge body, the self-close mechanism and the slow-close mechanism are enclosed within the first portion, the second portion, and the caps.

17. The hinge of claim 1, wherein the first portion has a first housing and a first flange extending from the first housing, and the second portion has a pair of second housings connected by a second flange, the first housing is positioned between the second housings, the self-close mechanism and the slow-close mechanism are positioned in the first housing and the second housings.

18. A door assembly, comprising:

a door; and a hinge attached to the door and controlling rotational movement of the door, the hinge including:

a hinge body having a first portion and a second portion, the first portion is attached to the door and is rotatable with respect to the second portion between an open position and a closed position;

a self-close mechanism disposed within the hinge body, the self-close mechanism applies a closing force on the first portion from a first angle of rotation between the first portion and the second portion to the closed position having a 0° angle of rotation between the first portion and the second portion, the closing force urging the first portion to the closed position, the first angle of rotation is approximately 180°; and a slow-close mechanism disposed within the hinge body, the slow-close mechanism applies a damping force on the first portion from a second angle of rotation between the first portion and the second portion to the closed position, the damping force slowing a rotational speed of the first portion to the closed position, the second angle of rotation is less than or equal to 45°.

19. The door assembly of claim 18, wherein the door has a panel, the first portion is attached to a hinge side of the panel and the door has a frame piece with an angled flange on a free side of the panel opposite the hinge side.

20. The door assembly of claim 18, wherein the hinge is one of a plurality of hinges attached to the door, the closing force and/or the second angle of rotation of each of the hinges is different.

* * * * *